No. 609,839. Patented Aug. 30, 1898.
W. H. SEWELL.
PNEUMATIC TIRE FOR CYCLES.
(Application filed Dec. 27, 1897.)
(No Model.)
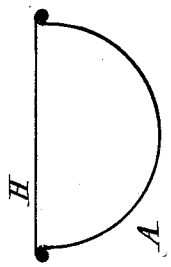
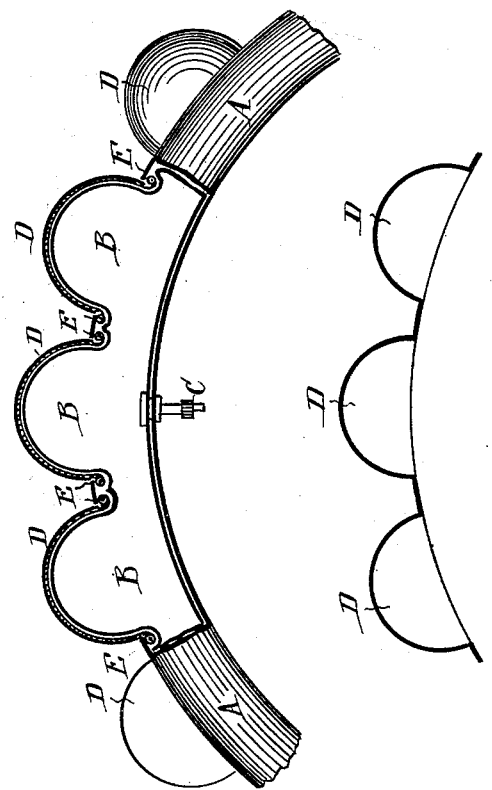
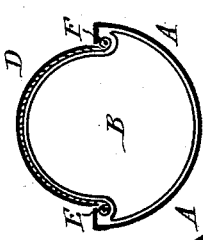
Witnesses
Herbert Bradley
Edward S. Allen
Inventor,
William Henry Sewell
By Knight Bros attys

UNITED STATES PATENT OFFICE.

WILLIAM HERBERT SEWELL, OF PORT STEWART, IRELAND.

PNEUMATIC TIRE FOR CYCLES.

SPECIFICATION forming part of Letters Patent No. 609,839, dated August 30, 1898.

Application filed December 27, 1897. Serial No. 663,726. (No model.)

*To all whom it may concern:*

Be it known that I, WILLIAM HERBERT SEWELL, general produce merchant, of Westcliff House, Port Stewart, Ireland, have invented certain new and useful Improvements in and Connected with Pneumatic Tires of Cycles, Carriages, and other Vehicles, of which the following is a specification.

In carrying out my invention I provide a tubular rim having openings on the ground-face, into which there are placed open or basin shaped segments. Within the hollow of the rim there is an air-tube provided with an inflating and deflating air-valve. This tube is sufficiently elastic as to, when inflated, distend itself into the open hollow of the sections or segments and so provide the walls of same with the requisite bearing power. The outer or ground face of the tubular rim may be either an integral part of same or may be attachable and detachable, and may be composed of differing materials—such, for instance, as a band of leather, canvas, or other fabric capable of being rigidly attached so as to complete the tubular formation of rim. In such case the running points or treads may take the form of basin-shaped nests or depressions in same.

I will now describe my invention, reference being made to the accompanying drawings.

Figure 1 is part section and part elevation of part of tire constructed according to my invention. Fig. 2 is a cross-section of Fig. 1. Fig. 3 depicts the open basin-shaped nests or depressions attached to or forming part of a continuous band which may form the ground-face of wheel-rim. Fig. 4 is one form of the open basin-shaped nests or sections. Fig. 5 is another form of open basin-shaped nests or sections, but with running apex protected or shod with small metal arc disk. Fig. 6 is a cross-section of rim A.

Referring to Figs. 1, 2, and 6, A is the tubular rim; B, the circumferential air-tube, with valve C, which when inflated breasts or distends itself into the open hollow of the basin shaped segments D, which are held *in situ* on or within rim-face by metal rings E, Figs. 1 and 2, or by the circumferential pressure of the inflated air-tube on flanges or thickened edges F, as shown in Figs. 4 and 5.

In Fig. 3 the open-shaped basins, nests, or depressions, which are attached to or form part of a continuous band, constitute the ground-face of wheel-rim.

The running apex of the segmentary treads may be protected against puncture by having a small metal disk or cup G, Fig. 5, molded into or attached to apex of sections or segments. The introduction of this metal disk or cup G will also reduce ground-contact and therefore ground-friction.

In Fig. 6 I have shown a tubular formation of rim A with attachable and detachable ground-face H.

Having now particularly described and ascertained the nature of my said invention and in what manner the same is to be performed, I declare that what I claim is—

In the tires of cycles, carriages, and other vehicles the use of a tubular formation of wheel-rim the outer or ground face of which will be provided with hollow nests or depressions or open or basin shaped sections or segments attached to or depending from said ground-face of rim and forming the tread, the whole inclosing a circumferential pneumatic tube of such elasticity as will, when inflated or densified by means of a valve projecting through wall of rim, enable it to breast or distend itself into the open hollow of the basin-shaped segments, nests, depressions, or treads and so provide the walls of same with the requisite pneumatic bearing power, substantially as described and illustrated on the accompanying sheets of drawings.

In testimony whereof I have signed my name to this specification in the presence of two witnesses.

WILLIAM HERBERT SEWELL.

Witnesses:
 JOHN LIDDLE,
 EDITH MARY EDMONDSTONE.